(12) United States Patent
Pourshakour (10) Patent No.: US 8,939,276 B2
(45) Date of Patent: Jan. 27, 2015

(54) DEVICE FOR STORING AND FEEDING OF RAW MATERIALS OF FRUIT AND/OR VEGETABLES

(76) Inventor: Shahram Pourshakour, Solna (SE)

( * ) Notice: Subject to any disclaimer, the term of this patent is extended or adjusted under 35 U.S.C. 154(b) by 0 days.

(21) Appl. No.: 14/004,226

(22) PCT Filed: Mar. 8, 2012

(86) PCT No.: PCT/SE2012/000027
§ 371 (c)(1),
(2), (4) Date: Sep. 10, 2013

(87) PCT Pub. No.: WO2012/121642
PCT Pub. Date: Sep. 13, 2012

(65) Prior Publication Data
US 2014/0001011 A1 Jan. 2, 2014

(30) Foreign Application Priority Data
Mar. 10, 2011 (SE) ...................................... 1100163

(51) Int. Cl.
| B65G 15/00 | (2006.01) |
| B65G 47/18 | (2006.01) |
| A23L 2/02 | (2006.01) |
| A23N 1/00 | (2006.01) |

(52) U.S. Cl.
CPC . *B65G 47/18* (2013.01); *A23L 2/02* (2013.01); *A23N 1/00* (2013.01)
USPC ........................................ 198/550.5; 221/112

(58) Field of Classification Search
USPC ................... 198/550.5, 550.01; 221/112, 113
See application file for complete search history.

(56) References Cited

U.S. PATENT DOCUMENTS

| 1,729,886 A | 10/1929 | Massie |
| 2,278,013 A | 3/1942 | Nicholson |
| 2,545,159 A | 3/1951 | McGihon |
| 4,360,204 A * | 11/1982 | Karr .............................. 221/301 |
| 4,974,505 A | 12/1990 | Torrisi |
| 5,544,572 A | 8/1996 | Garmendia |
| 5,743,176 A | 4/1998 | Anderson et al. |
| 6,240,832 B1 * | 6/2001 | Schmed et al. ............... 221/121 |
| 6,941,855 B2 * | 9/2005 | Denisart et al. ............... 221/113 |
| 8,146,778 B2 * | 4/2012 | Shen .............................. 221/113 |

FOREIGN PATENT DOCUMENTS

| EP | 0509950 | 10/1992 |
| EP | 2024944 | 12/2010 |
| FR | 2486365 | 1/1982 |

OTHER PUBLICATIONS

International Search Report dated May 21, 2012, corresponding to PCT/SE2012/000027.

* cited by examiner

Primary Examiner — William R Harp
(74) Attorney, Agent, or Firm — Young & Thompson (57) ABSTRACT

Disclosed is a device for storing and feeding of raw materials during production of fruit- and/or vegetable-juice, which device includes a number of storage and feed units for fruit/vegetables and/or pieces of fruit/vegetables, and a bottom element. Disclosed features are that the storage and feed units are situated on a support disc, that each of the storage and feed units is allocated an outlet aperture in the support disc, that a feed disc is situated below the support disc, that the feed disc is rotatably supported by the bottom element and is provided with a feed aperture, and that the feed disc is rotatable relative to the support disc so that the feed aperture can be brought central to any desired outlet aperture, and a unit for conveying to a juice machine the fruit/vegetables and/or pieces of fruit/vegetables fed.

20 Claims, 13 Drawing Sheets

DEVICE FOR STORING AND FEEDING OF RAW MATERIALS OF FRUIT AND/OR VEGETABLES

TECHNICAL FIELD OF THE INVENTION

The present invention refers to a device for storing and feeding of raw materials of fruit and/or vegetables for further processing of these raw materials, which device comprises a number of storage and feed units for fruit/vegetables and/or pieces of fruit/vegetables, and a bottom element.

STATE OF THE ART

In an apparatus known from EP 2024944 for producing fruit juice or vegetable juice, pieces of fruit or vegetables are stored in containers which are provided with an only schematically depicted feed mechanism. The pieces of fruit or vegetables are brought together in a mixer in which preparation of juice takes place. The juice is led from the mixer to a glass.

OBJECT AND FEATURES OF THE INVENTION

A primary object of the present invention is to propose a device of the kind defined in the introduction such that the storage and feeding of fruit or vegetables take place in a way which causes no damage to the fruit/vegetables.

Another object of the present invention is to afford a large measure of flexibility as regards mixing of fruit and vegetables in the raw materials which leave the device.

A further object of the present invention is to ensure that many different kinds of vegetables and fruit may be used with the device according to the present invention.

Yet a further object of the present invention is to ensure that the raw materials are cooled and therefore undergo hygienic treatment.

At least the primary object of the present invention is achieved by the features indicated in the independent claim. Preferred embodiments of the invention are defined in the dependent claims.

BRIEF DESCRIPTION OF THE DRAWINGS

A preferred embodiment of the invention is described below with reference to the attached drawings, in which.

DETAILED DESCRIPTION OF PREFERRED EMBODIMENTS OF THE PRESENT INVENTION

Figure 1:
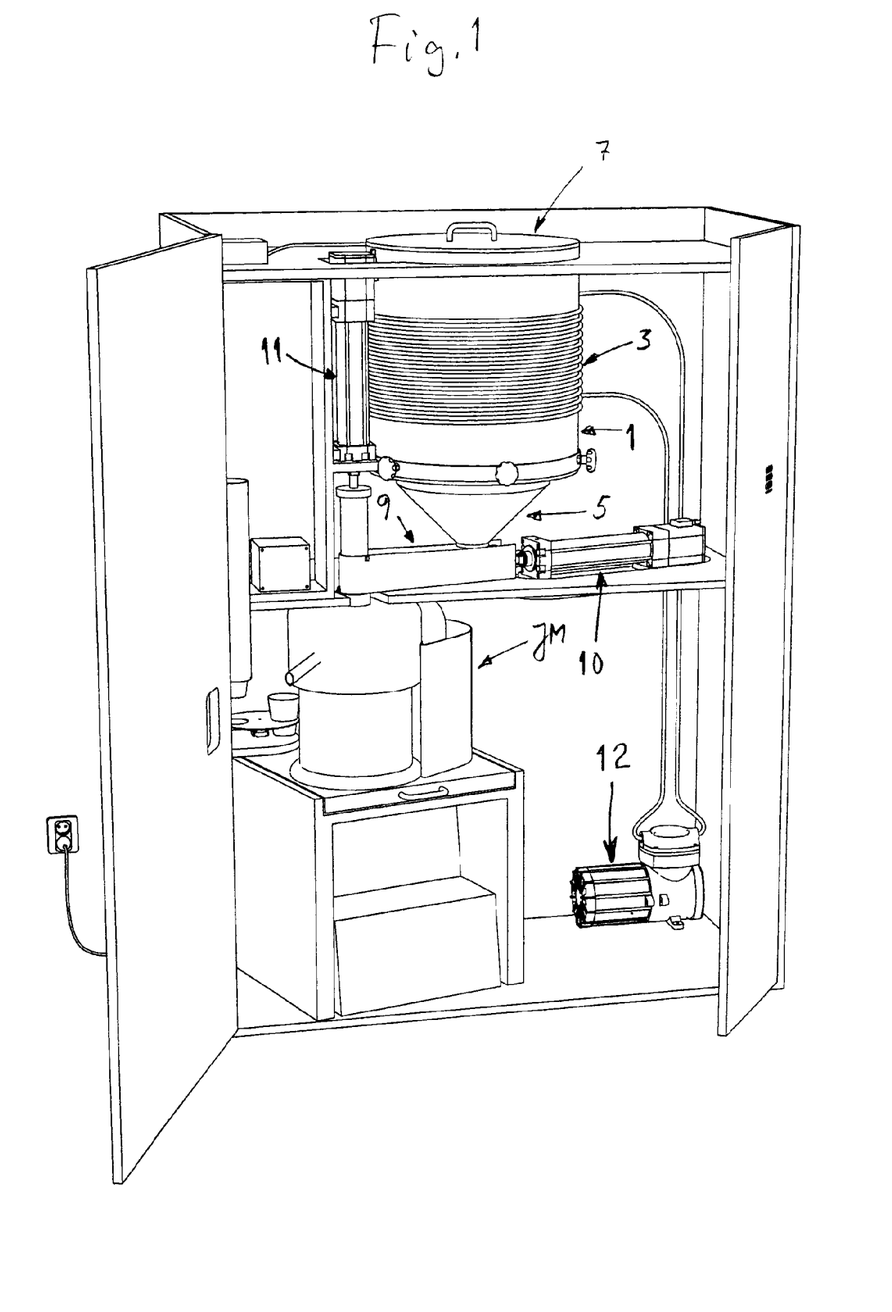
FIG. 1 is a perspective view of a device according to the present invention.

The device depicted in FIG. 1 for storing and feeding of raw materials during production of fruit- and/or vegetable-juice comprises a container 1, a cooling coil 3 placed round the container, a funnel-like bottom element 5 and a lid 7 which is placed on top of the open upper end of the container 1.

A displacement mechanism 9 is situated close to the bottom element 5 and comprises a first pressure medium cylinder 10 arranged horizontally and a second pressure medium cylinder 11 arranged vertically. The displacement mechanism 9 is connected to a juice machine JM which is normally a juice machine available on the market. There are various conceivable juice machines on the market which might be connected to the device according to the present invention.

In the embodiment depicted, the cooling coil 3 depicted in FIG. 1 is connected to a compressor 12.

Figure 2:
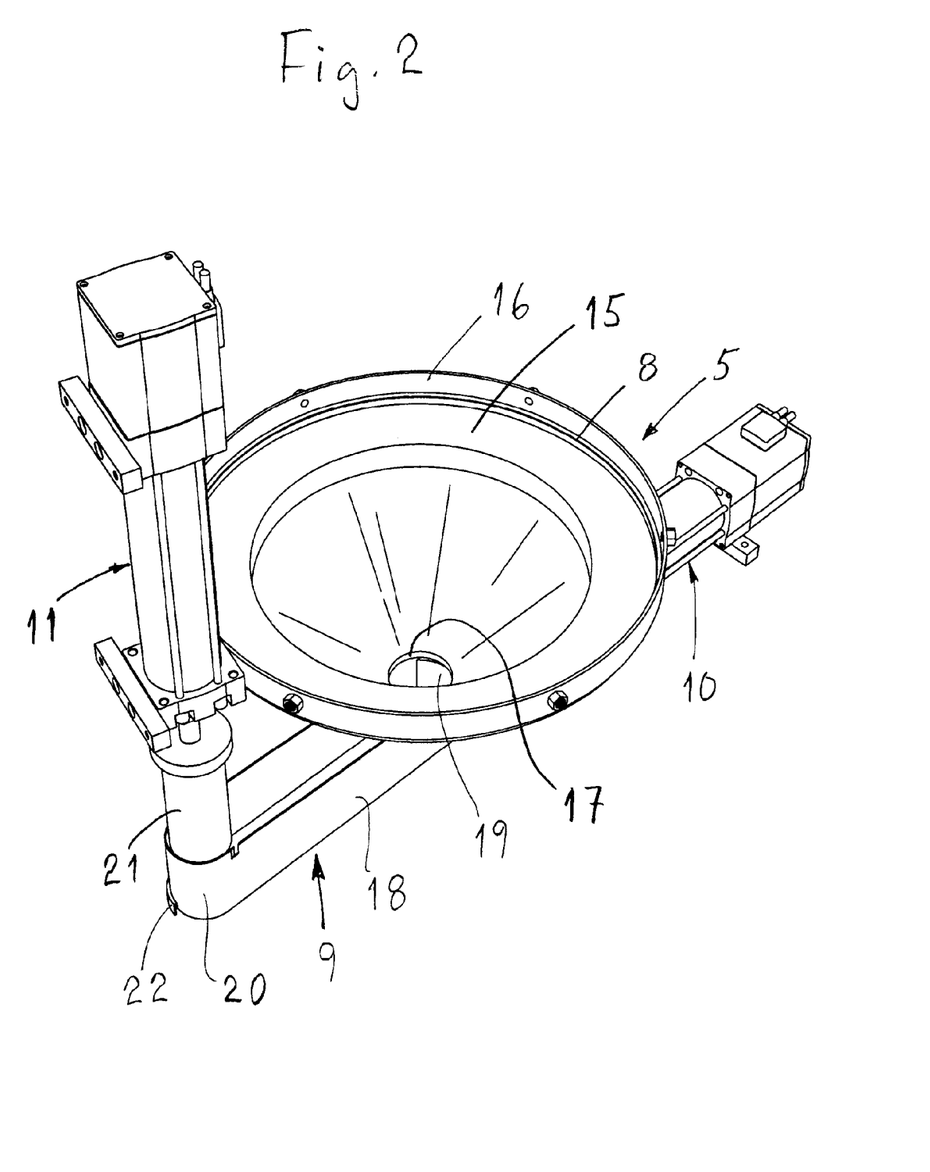
FIG. 2 is a perspective view of an important part of the device according to the present invention.

FIG. 2 depicts the funnel-like bottom element 5 and the displacement mechanism 9. The funnel-like bottom element 5 has a rolling track 15 surrounded by a border 16, which border 16 has an extent transversely to the plane which the rolling track 15 defines. At some distance from the rolling track 15, an O-ring 8 is fitted to, and extends along the whole circumference of, the border 16. The funnel-like bottom element 5 has a bottom aperture 17 and there is below this aperture a channel 18 which is part of the displacement mechanism 9.

The first pressure medium cylinder 10 which forms part of the displacement mechanism 9 has a piston rod (not depicted in FIG. 2) which extends in the channel 18, with a piston 19 or the like situated at the free end of the piston rod. The shape of the piston 19 is appropriate to that of the channel 18. When the piston rod of the first pressure medium cylinder moves towards the second pressure medium cylinder 11, the piston 19 will carry with it the fruit/vegetables and/or pieces of fruit/vegetables which are in the channel 18, causing an accumulation of fruit/vegetables and/or pieces of fruit/vegetables at the end 20 of the channel 18 which points away from the first pressure medium cylinder 10. The vertically arranged second pressure medium cylinder 11 likewise has a piston rod which has at its free end a cylindrical piston 21. The purpose of the second pressure medium cylinder is to push fruit/vegetables and/or pieces of fruit/vegetables into the juice machine JM via an aperture (not depicted) in the bottom of the end 20 of the channel 18. The juice machine's inlet is situated centrally to the aperture in the bottom of the channel 18. The channel is provided with a guide 22 to ensure that the juice machine's inlet is correctly oriented relative to the aperture in the channel.

Figure 3:
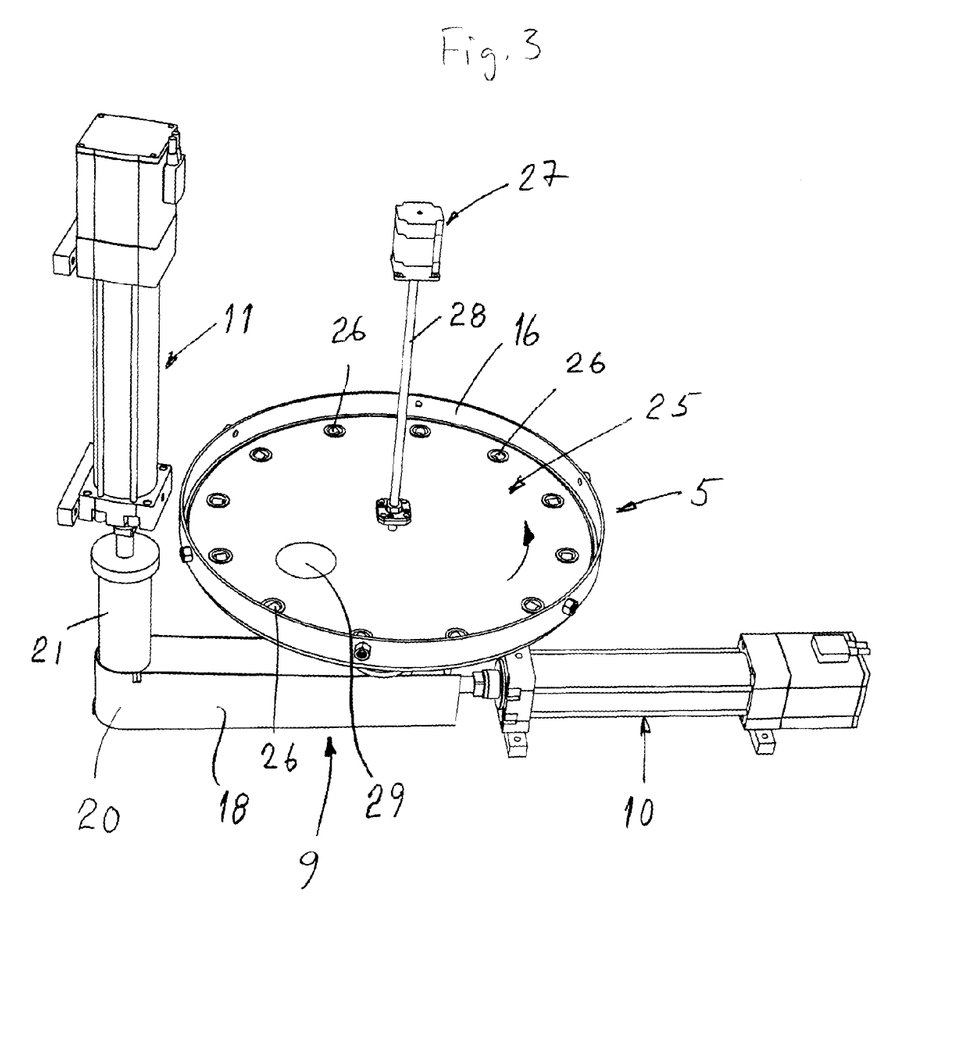
FIG. 3 is a perspective view of the important part supplemented by further parts.

FIG. 3 depicts a feed disc 25 placed on the rolling track 15 of the funnel-like bottom element 5 and provided with a number of bearing rollers 26 which abut against the rolling track 15. This configuration results in the feed disc 25 rotating relative to the rolling track 15 when caused to do so by an electric motor 27 schematically depicted in FIG. 3 which has protruding from it a rotatable shaft 28 which has its free end fastened to the centre of the feed disc 25. A feed aperture 29 is provided in the feed disc.

Figure 4:
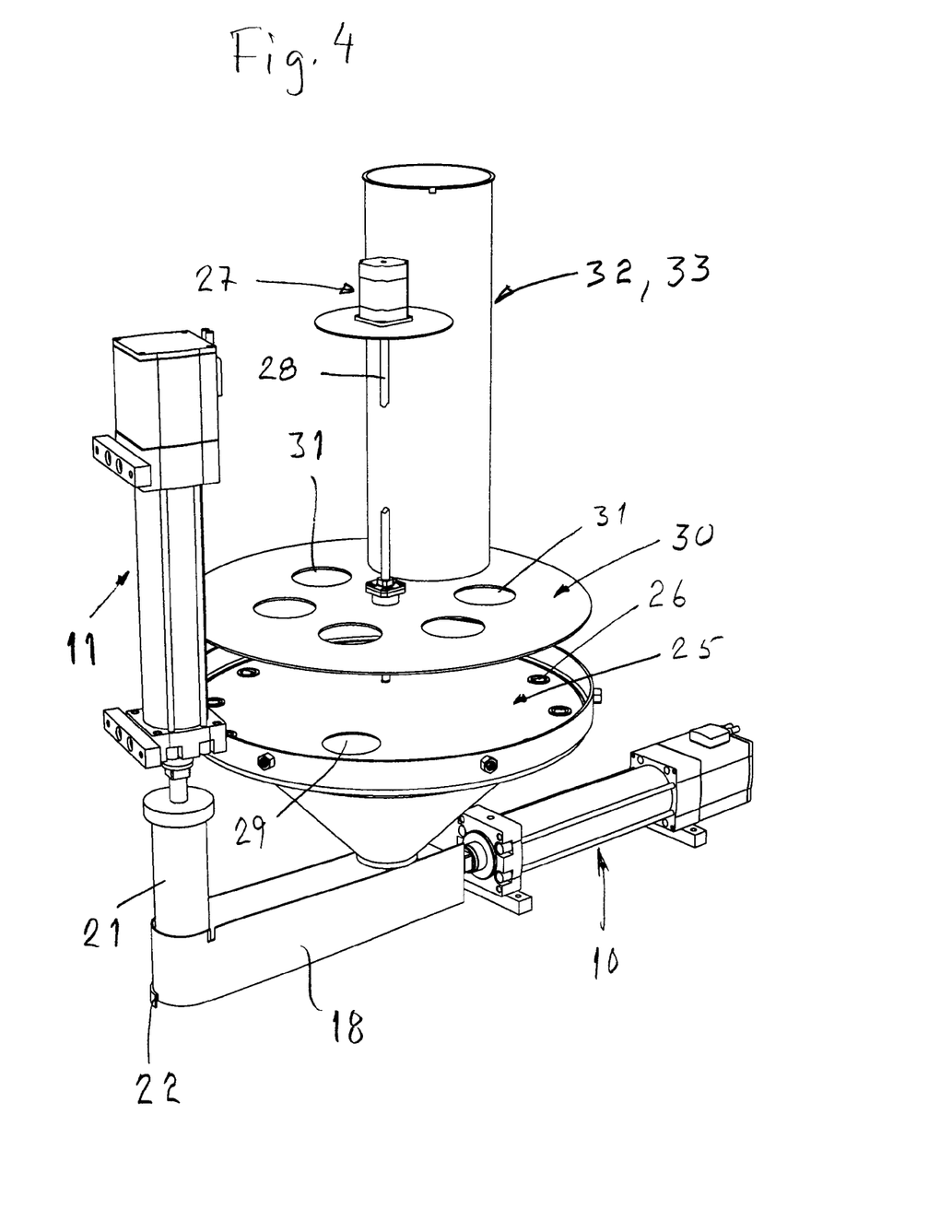
FIG. 4 is a perspective view with further parts added as compared with FIG. 3.

FIG. 4 depicts a support disc 30 which is arranged to be placed in the bottom element 5 but in this diagram for the sake of clarity is raised relative to the feed disc 25. The support disc 30 is provided with a number of outlet apertures 31 evenly distributed along an imaginary circle. A cylinder 32 or 33 situated centrally above one of the outlet apertures 31 is applied to the support disc 30.

Figure 5:
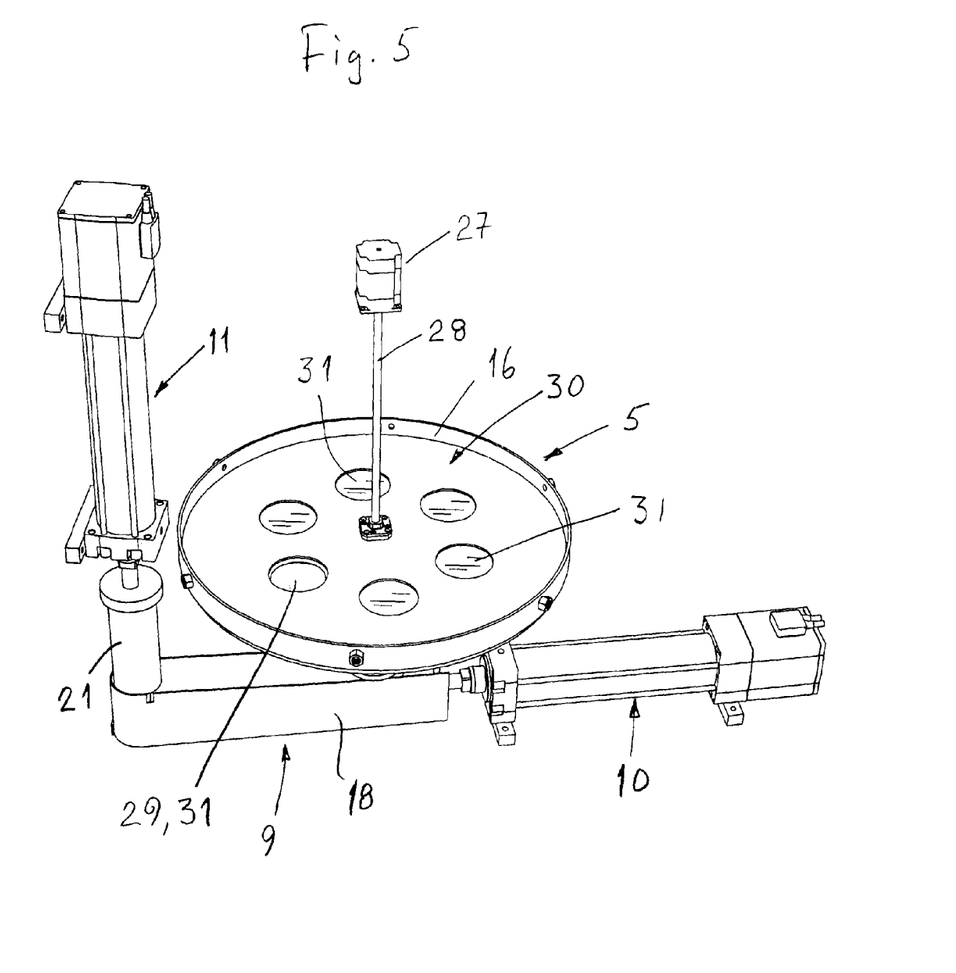
FIG. 5 is a perspective view in which the parts depicted in FIG. 4 are in a more assembled state.

FIG. 5 shows the support disc 30 lowered to abutment against the O-ring 8 situated on the border 16. The support disc 30 serves as a permanent bottom in the container 1 which is itself supported by a suitable frame (not depicted). The support disc 30 is situated at some distance from the feed disc 25. The rotatable shaft 28 of the electric motor 27 passes through the support disc 30 and can rotate relative to the latter via a bearing. The outlet aperture 29 in the feed disc 25 is situated centrally to an outlet aperture 31.

Figure 6:
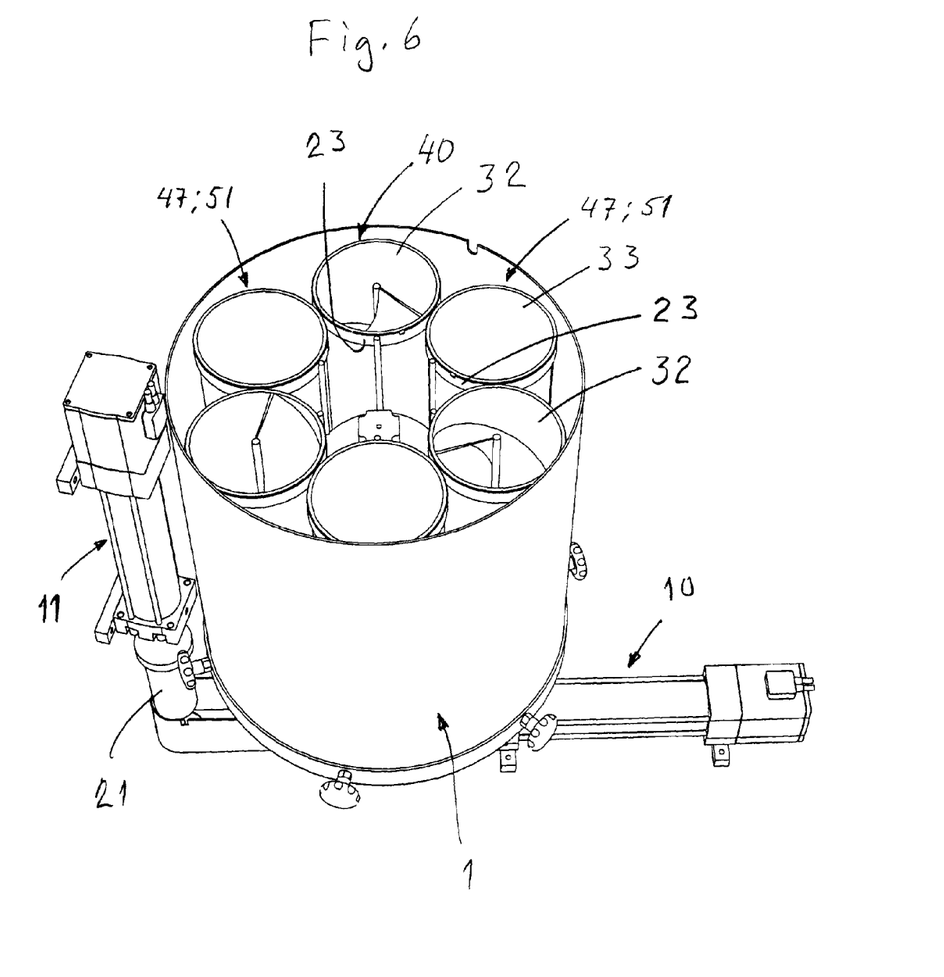
FIG. 6 is a perspective view in which storage and feed units which form part of the device are in a container which forms part of the device.

FIG. 6 shows a number of cylinders 32, 33 placed on the support disc 30 and each allocated an outlet aperture 31 in the support disc 30. Each cylinder also has allocated to it a framework 23 to ensure that it stands stably on the support disc 30. FIG. 6 also shows a spiral insert 34, see FIG. 8, placed in a first set of cylinders 32, and a second set of cylinders 33 configured in a different way.

Figures 7, 8:
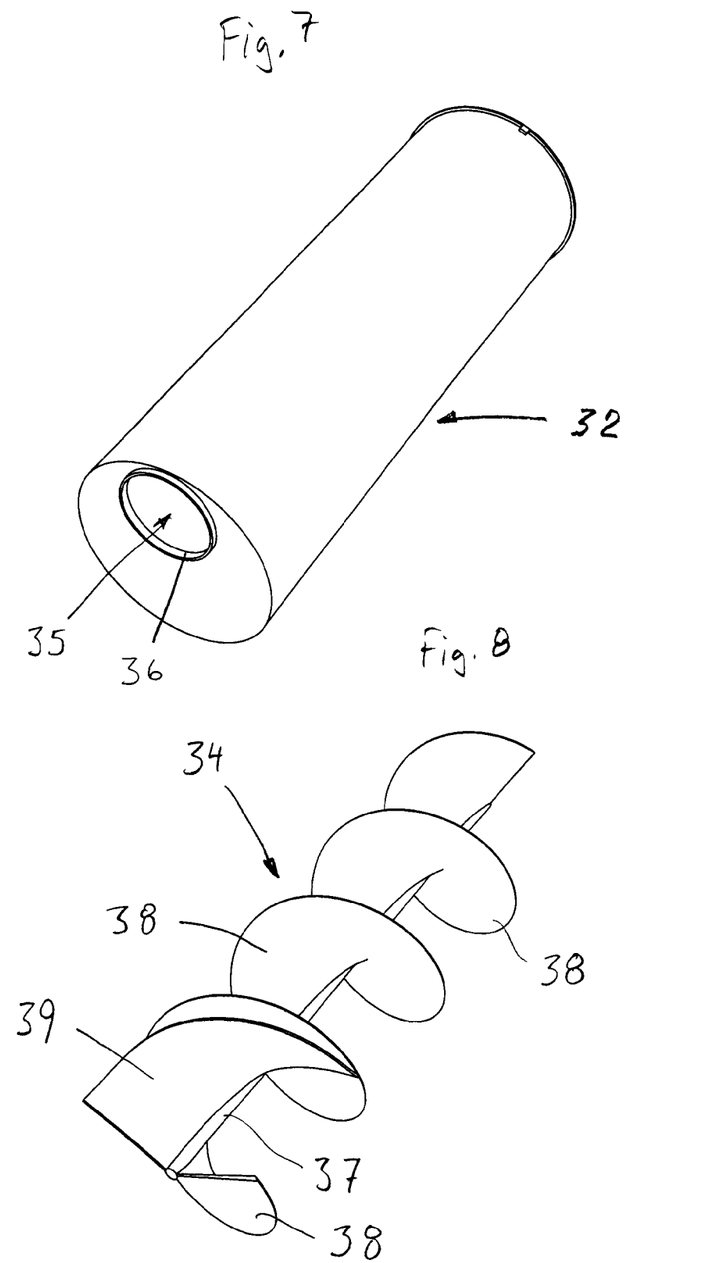
FIG. 7 is a perspective view of a first embodiment of a cylinder which forms part of the device and which pertains to a first storage and feed unit.
FIG. 8 is a perspective view of an insert intended to be accommodated in the cylinder according to FIG. 7.

FIG. 7 is a perspective view of a cylinder 32 from the first set of cylinders, each of them defining an internal cylindrical space which accommodates a spiral insert 34 depicted in FIG. 8. The bottom of each cylinder 32 has a discharge aperture 35 provided with a collar 36. The discharge aperture 35 occupies only part of the cylinder's bottom surface.

The spiral insert 34 depicted in FIG. 8 has a central spindle 37 along which a spiral track 38 extends. At the lower end in FIG. 8 of the spiral insert 34 there is a further plane 39 which in the embodiment depicted is turned and has a substantially smaller extent in the longitudinal direction of the central spindle 37 than the spiral track 38. In the embodiment depicted, the further plane 39 connects to the spiral track 38 at a distance from the lower end of the insert 34. The function of the further plane 39 is explained below.

Figure 9:
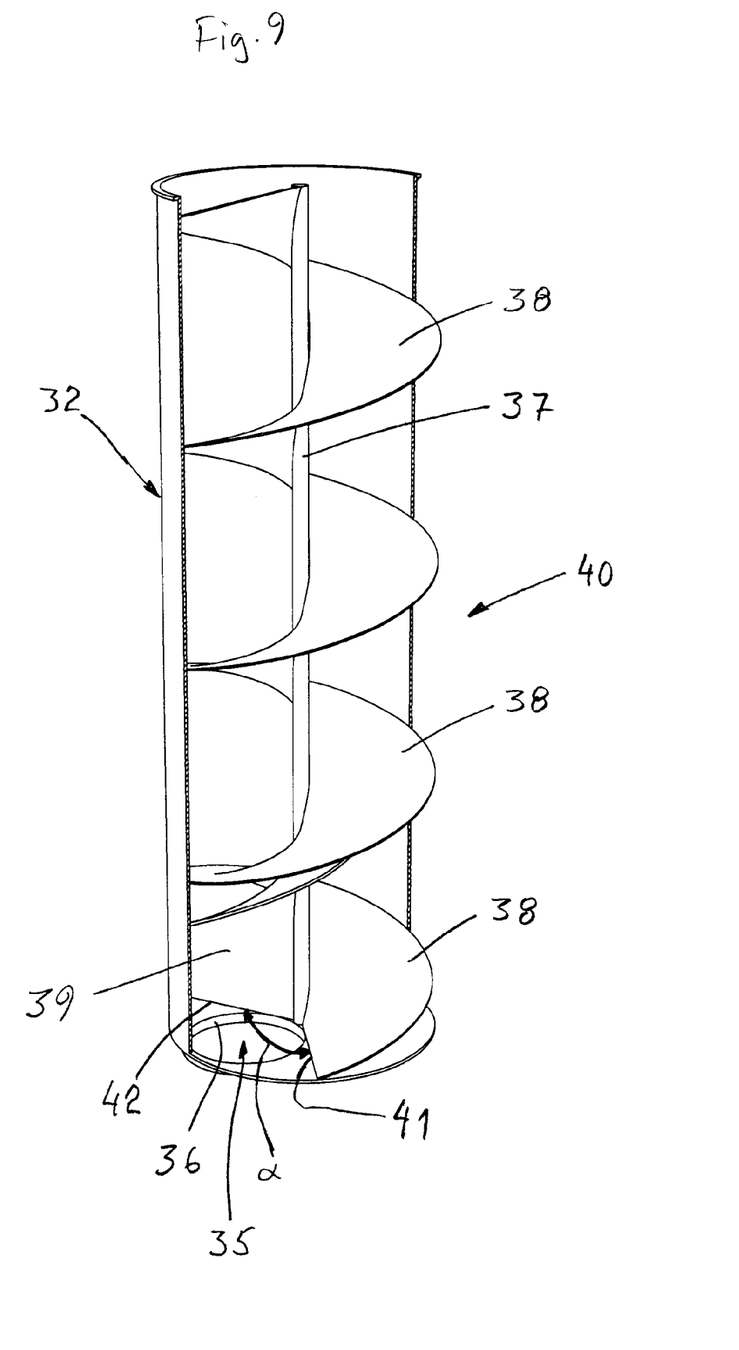
FIG. 9 is a perspective view in which the insert according to FIG. 8 is accommodated in the cylinder according to FIG. 7, with part of the cylinder wall omitted for greater clarity.

FIG. 9 shows the spiral insert 34 fitted in a cylinder 32, with part of the cylinder wall cut away for greater clarity. The cylinder 32 and the insert 34 together constitute a first storage and feed unit 40 which is fitted via the collar 36 in an outlet aperture 31 of the support disc 30, i.e. the collar 36 protrudes into the outlet aperture 31. The first storage and feed unit 40 is particularly intended to accommodate fruit and/or vegetables which are round in shape, e.g. oranges, apples, mandarins, clementines, satsumas, tomatoes. Round fruit and/or vegetables roll on the spiral track defined by the spiral inserts 34. With advantage, the whole of the first storage and feed unit 40 is filled with the fruit and/or vegetables desired by the user. As may be seen in FIG. 9, the spiral track 38 ends at a first edge 41 situated on one side of the discharge aperture 35, and the turned further plane 39 ends at a second edge 42 situated on the other side of the discharge aperture 35. This means that round fruit and/or vegetables rolling off the spiral track 38 are guided down into the discharge aperture 35 by the turned further plane 39. The angle α which the edges 41 and 42 define between them is obtuse.

Figure 10:
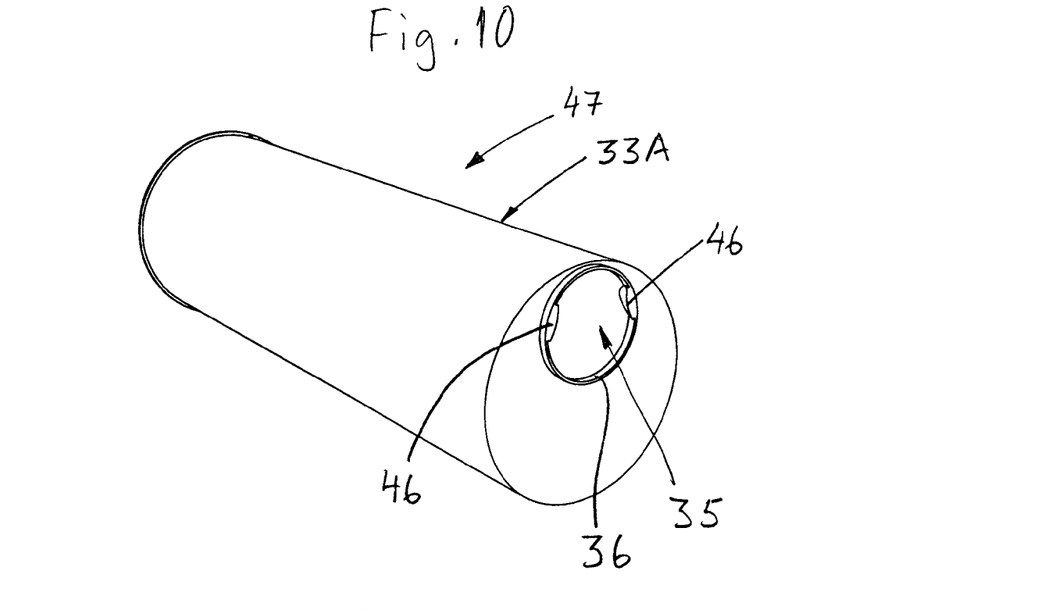
FIG. 10 depicts a first embodiment of a second storage and feed unit.
Figure 11:
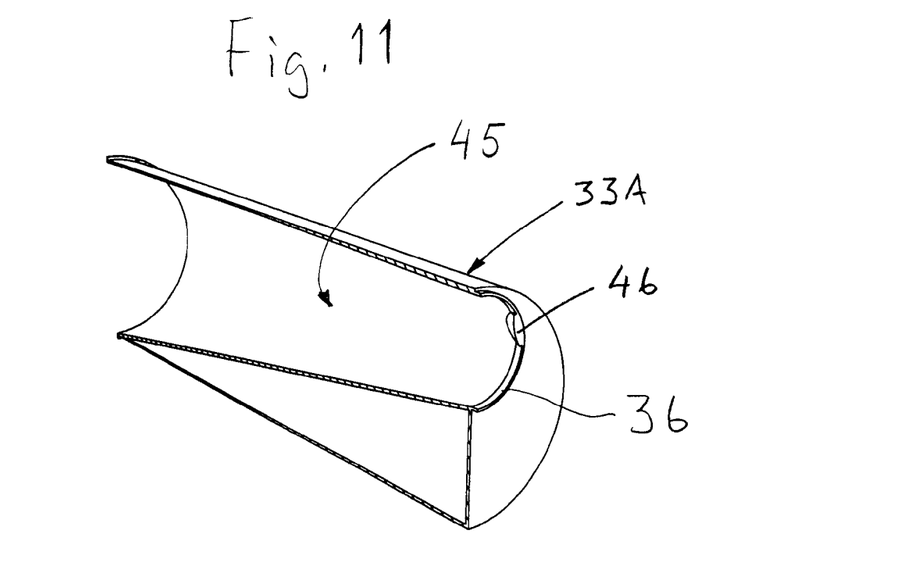
FIG. 11 is a longitudinal section through the storage and feed unit according to FIG. 10.

FIGS. 10 and 11 illustrate a first embodiment of a cylinder 33A from the second set, with a generally cylindrical external shape. An insert which defines a conical internal space 45 is placed in the cylinder. The bottom of the cylinder 33A is provided with a discharge aperture 35 similar to that of the cylinder 32, so the same reference numeral is used. The same also applies to the collar 36. The discharge aperture 35 occupies only part of the bottom surface of the cylinder 33A. Almond-shaped locking means are provided in the discharge aperture 35 to obstruct the gaps which form when the feed aperture 29 is between two outlet apertures 31.

As illustrated in FIG. 11, the internal space 45 between the ends of the cylinder 33A is conical with a constant taper between the ends of the cylinder. The cylinder 33A defines in conjunction with the insert a second storage and feed unit 47.

Figure 12:
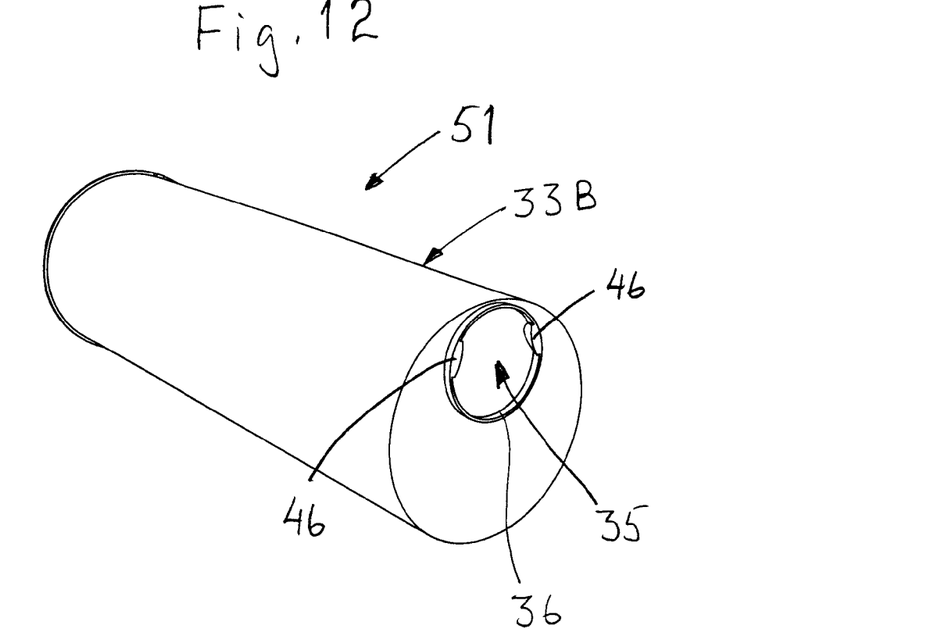
FIG. 12 depicts a second embodiment of a second storage and feed unit.
Figure 13:
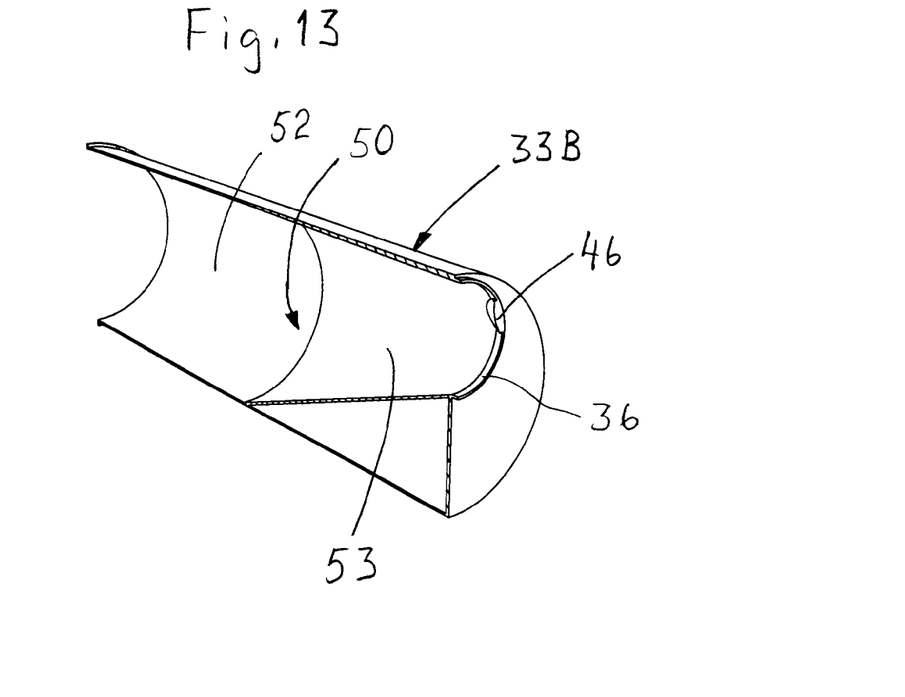
FIG. 13 is a longitudinal section through the storage and feed unit according to FIG. 12.

FIGS. 12 and 13 depict a second embodiment of a cylinder 33B from the second set, with a generally cylindrical external shape. An insert accommodated in this cylinder defines an internal space 50 which is partly conical. The cylinder 33B is provided with a discharge aperture 35 and a collar 36 in a similar way to the cylinder 33A. The discharge aperture 35 occupies only part of the bottom surface of the cylinder 33B. The cylinder 33B defines in conjunction with the insert a third storage and feed unit 51. Almond-shaped locking means 46 are provided in the discharge aperture 35 to obstruct the gaps which form when the feed aperture 29 is between two outlet apertures 31.

As illustrated in FIG. 13, the internal space 50 is composed of a cylindrical portion 52 and a conical portion 53 which connects to one end of the cylindrical portion. The conical portion 53 extends between the cylindrical portion 52 and the discharge aperture 35.

The storage and feed units 47, 51 are preferably used when the fruit/vegetables are cut into irregular shapes and therefore tend not to roll. The storage and feed units 47, 51 may however also be used for smaller round fruit/vegetables, e.g. cherries or cocktail tomatoes. The pieces of fruit/vegetables fill at least partly the conical internal space, and during feeding they flow out through the mutually central apertures 35, 31, 29.

The device described above for storing and feeding of raw materials during production of fruit- and/or vegetable-juice functions as follows. FIG. 6 shows the container 1 with a number of storage and feed units 40 and 47 or 51 mounted on the support disc 30 as described above. The combination of storage and feed units depicted in FIG. 6 is merely one example. Thus the storage and feed units may be freely combined to produce desired beverages. The storage and feed units 40, 47/51 are filled with suitable fruit/vegetables and/or pieces of fruit/vegetables. When the user wishes no fruit/vegetables and/or pieces of fruit/vegetables to be fed to the juice machine JM, the feed disc 25 is oriented so that the feed aperture 29 is not central to any outlet aperture 31. When the user wishes fruit/vegetables and/or pieces of fruit/vegetables to be fed to the funnel-like bottom element 5 and thence to the channel 18, the feed aperture 29 is placed centrally to an outlet aperture 31 so that fruit/vegetables and/or pieces of fruit/vegetables are fed to the bottom element and thence through the bottom aperture 17 to the channel 18. The amount fed is controlled by the amount of time for which the feed aperture 29 is central to the outlet aperture 31. When a desired amount has been fed, the feed disc 25 is rotated by the electric motor 27, and the feed aperture 29 is either placed between two outlet apertures 31 or is placed centrally to another outlet aperture 31. This makes it possible for the user to control which fruit/vegetables and/or pieces of fruit/vegetables are fed to the channel 18. It will be appreciated that the user can have a mixture of fruit/vegetables and/or pieces of fruit/vegetables fed out through the bottom aperture 17 of the bottom element 5 to the channel 18.

When fruit/vegetables and/or pieces of fruit/vegetables are in the channel 18, the piston 19 belonging to the first pressure medium cylinder 10 moves them in the channel's longitudinal direction to the end of the channel which points away from the first pressure medium cylinder. The cylindrical piston 21 belonging to the second pressure medium cylinder 11 then pushes fruit/vegetables and/or pieces of fruit/vegetables into the juice machine JM for it to produce fruit- and/or vegetable-juices in a conventional way. As mentioned above, the juice machine may be any suitable juice machine available on the market.

Figure 14:
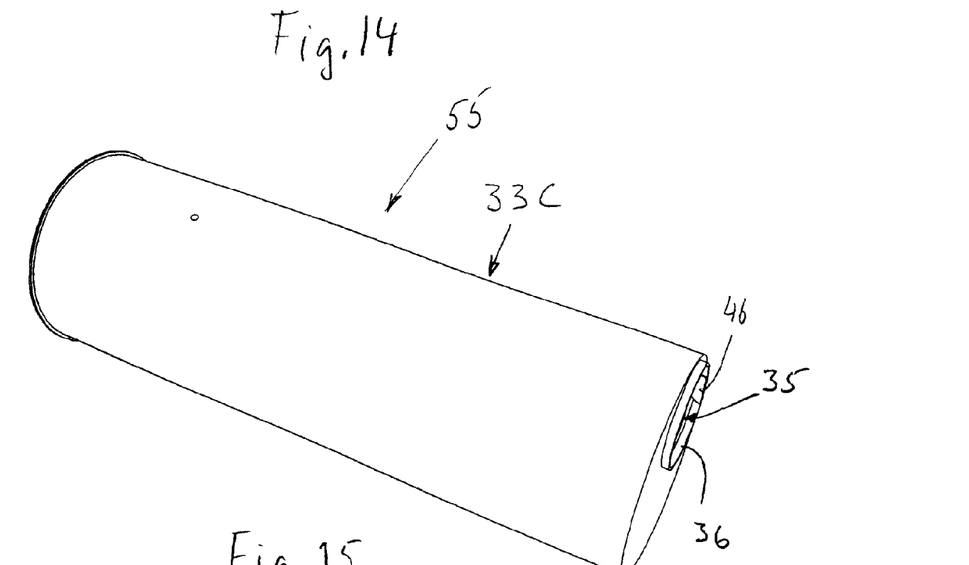
FIG. 14 is a perspective view of a third storage and feed unit.
Figure 15:
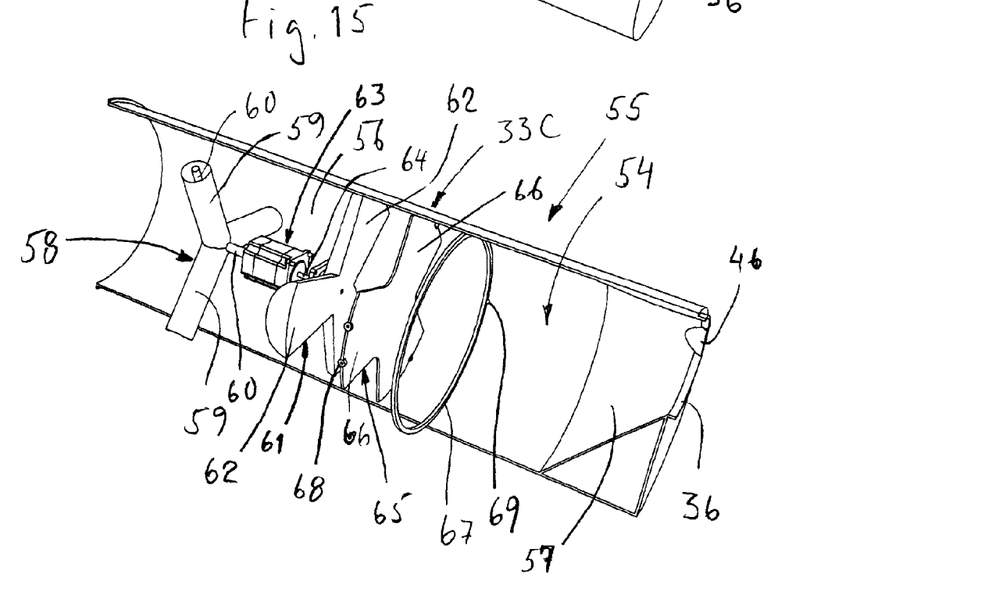
FIG. 15 is an exploded perspective view of the components of the third storage and feed unit.

FIGS. 14 and 15 illustrate a further alternative embodiment of a cylinder 33C from the second set, with a generally cylindrical external shape. An insert accommodated in the cylinder 33C defines an internal space 54 which is partly conical. The cylinder is provided with a discharge aperture 35 and a collar 36 similar to those of the cylinders 33A and 33B. The discharge aperture 35 occupies only part of the bottom surface of the cylinder 33C. The cylinder 33C defines in conjunction with the insert a third storage and feed unit 55. Almond-shaped locking means 46 are provided in the discharge aperture 35 to obstruct the gaps which form when the feed aperture 29 is between two outlet apertures 31.

As depicted in FIG. 15, the internal space 54 comprises a cylindrical portion 56 and a conical portion 57 which connects to one end of the cylindrical portion. The conical portion 57 extends between the cylindrical portion 56 and the discharge aperture 35.

Means are provided in the cylindrical portion 56 to control the supply of fruit/vegetables and/or pieces of fruit/vegetables. These means comprise a first stationary element 58 itself comprising three pipes 59 which meet at the centre of the cylindrical portion 56. The pipes 59 are anchored in the cylindrical portion's inside wall surface. The purpose of the pipes is to serve as guide means for an electrical cord 60 to an electric motor described below.

Also situated in the cylindrical portion 56 is a second stationary element 61 comprising three portions 62 which extend radially and have their free ends anchored in the cylindrical portion's inside wall surface. The anchoring may for example be by welding. In the embodiment depicted, the width of the radially extending portions 62 increases towards the cylindrical portion's inside wall surface. Apertures which fruit/vegetables and/or pieces of fruit/vegetables can pass through are defined between the portions 62 and the cylindrical portion's inside wall surface.

An electric motor 63 is mounted on the side of the second stationary element 61 which faces towards the first stationary element 58. The electric motor 63 receives its power supply from the cord 60. The electric motor 63 is preferably screwed firmly onto the second stationary element 61. The electric motor 63 has an output shaft 64 which extends through the second stationary element 61.

A rotatable disc 65 is fitted on the side of the second stationary element 61 which faces away from the electric motor 63. The disc 65 has three portions 66 which extend radially, with their free ends extending adjacent to the cylindrical portion's inside wall surface. The width of the radially extending portions 66 may increase towards their free ends or be constant. Apertures which fruit/vegetables and/or pieces of fruit/vegetables can pass through are defined between the portions 66 and the cylindrical portion's inside wall surface. The rotatable disc 65 is connected to the output shaft 64 of the electric motor 63 and can therefore be rotated by the electric motor 63. The rotatable disc 65 is supported for rotation in a ring 67 by rolling bearings 68 situated at the free ends of the radially extending portions 66.

A sensor 69, e.g. an optical sensor which detects whether the upper level of the raw materials stored drops below the level of the sensor, is situated on the underside of the ring 67.

The components shown below the electric motor 63 in the exploded view in FIG. 15 are in reality situated nearer to one another in the axial direction.

The components described above allow variation of the apertures which fruit/vegetables and/or pieces of fruit/vegetables pass through. Examination of FIG. 15 shows that rotation of the rotatable disc 65 relative to the second stationary element 62 results in variation in the size of the apertures which fruit/vegetables and/or pieces of fruit/vegetables pass through. It is also possible for these apertures to be closed completely by suitable positioning of the rotatable disc 65 relative to the second stationary element 62.

Figure 16:
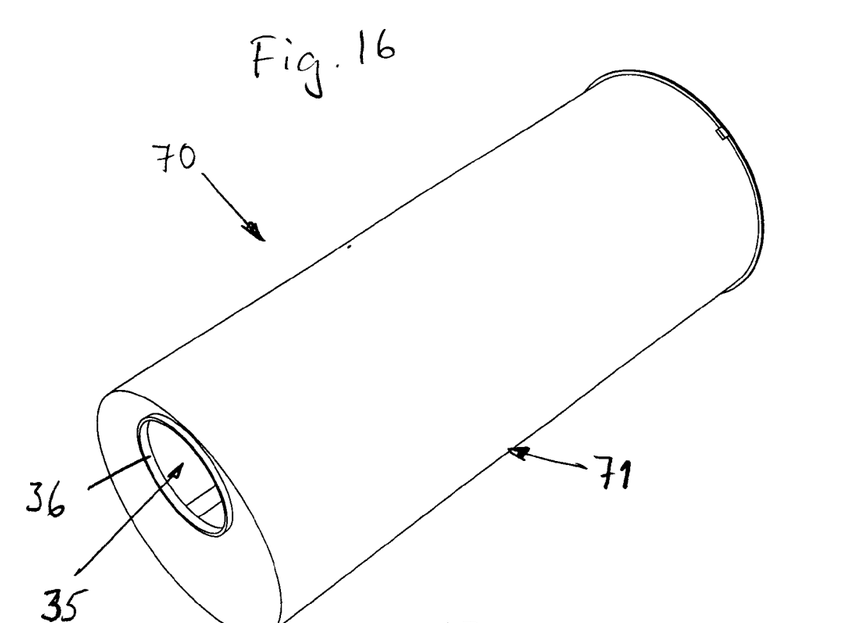
FIG. 16 is a perspective view of a cylinder which forms part of an alternative embodiment of a first storage and feed unit.
Figure 17:
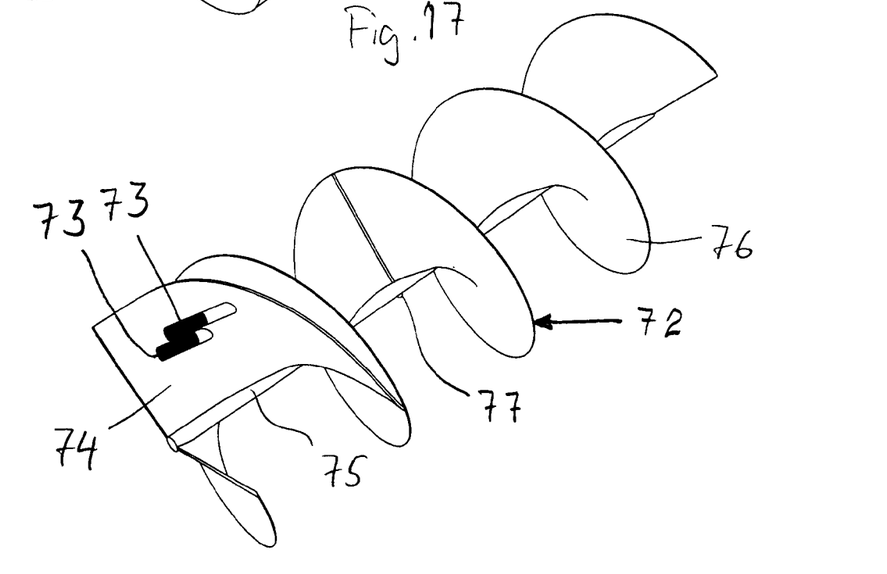
FIG. 17 is a perspective view of a spiral insert which forms part of the unit according to FIG. 16.
Figure 18:
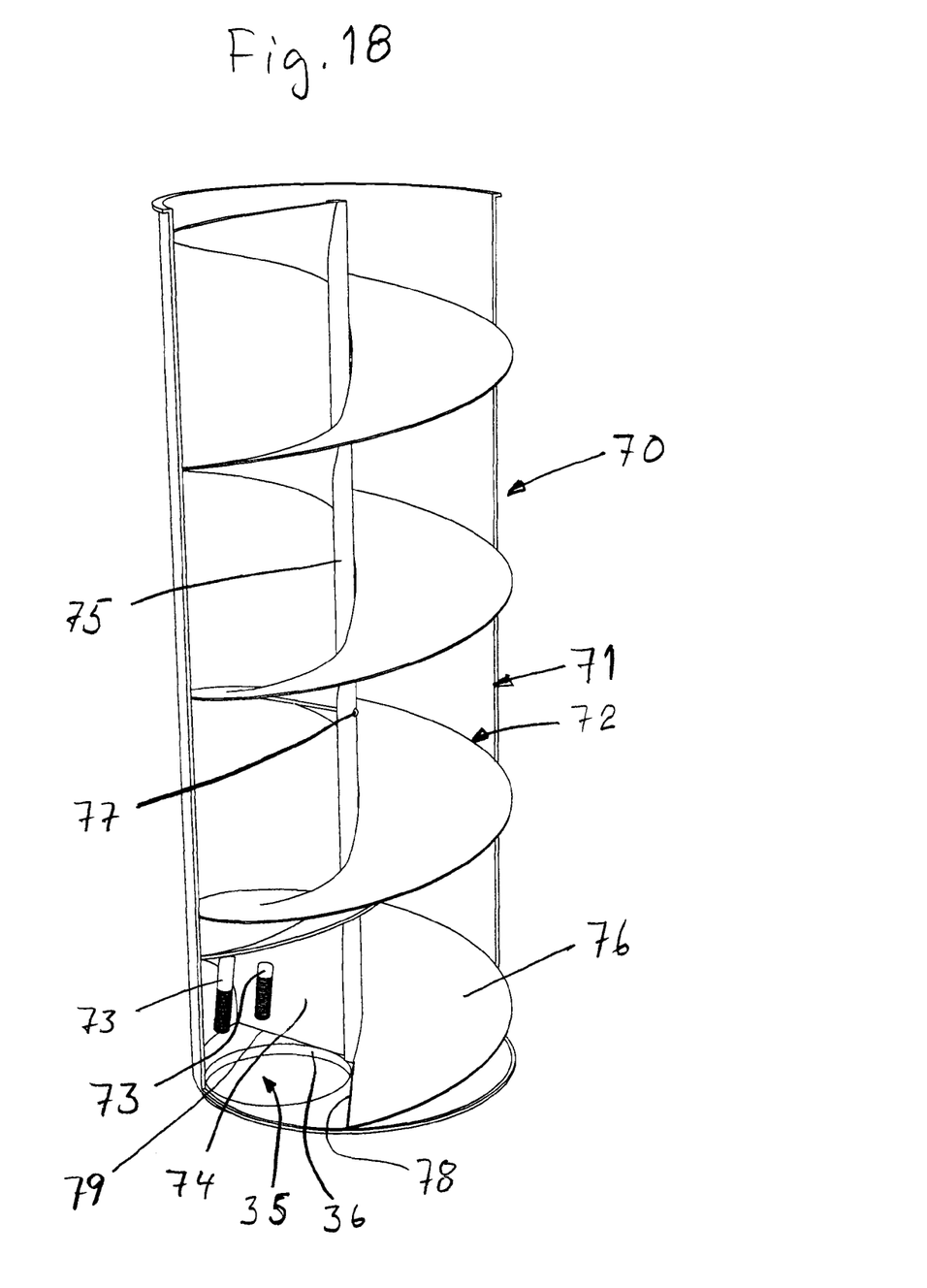
FIG. 18 is a perspective view of the first storage and feed unit, with the cylinder partly cut away.

FIGS. 16-18 illustrate an alternative embodiment of a first storage and feed unit 70 which comprises a cylinder 71 in which a spiral insert 72 is accommodated. The configuration of the storage and feed unit 70 corresponds substantially to the first storage and feed units 40, but the spiral insert 72 in the first storage and feed unit 70 is provided with a number of further components intended to damp the acceleration of the fruit/vegetables and/or pieces of fruit/vegetables which pass through the spiral insert 72. Thus in the embodiment depicted two coil springs 73 are fitted in a further plane 74 close to a discharge aperture 35 of the cylinder 71, which aperture is provided with a collar 36. In the embodiment depicted, the further plane 74 is turned. The springs 73 are preferably positioned somewhat obliquely so that their free ends are nearer to the cylinder 71 than their portion which is fastened to the further plane 74. Certain of the fruit/vegetables and/or pieces of fruit/vegetables which slide/roll down a spiral track 76 will reach such a speed that they bypass the discharge aperture 35, in which case they are intercepted by the springs 73, which guide them back down through the aperture 35.

A sensor 77, e.g. an optical sensor to detect whether the upper level of the stored raw materials drops below the level of the sensor, is situated on a central spindle 75 of the spiral insert 72. In the embodiment depicted, the sensor 77 is situated somewhat below half the height of the central spindle 75.

The lower edge of the spiral track 76 is denoted by ref. 78 and is situated on one side of the discharge aperture 35. The further plane 74 ends at a second edge 79 situated on the other side of the discharge aperture 35.

CONCEIVABLE MODIFICATIONS OF THE INVENTION

The embodiment described above of the invention comprises a channel 18 and pressure medium cylinders 10, 11 which feed raw materials relative to the channel 18. It is possible, however, within the scope of the present invention to also conceive of the device according to the invention without the channel 18 and the pressure medium cylinders, in which case fruit/vegetables and/or pieces of fruit/vegetables would be fed directly from the bottom element 5 to a suitable type of juice machine JM.

In the embodiment described above of the invention, fruit/vegetables and/or pieces of fruit/vegetables are fed to a juice machine. It is however also possible within the scope of the invention to conceive of some other form of processing of the fruit/vegetables and/or pieces of fruit/vegetables, a non-limitative example of which might be that they are fed to a cutting machine.

The invention claimed is:

1. A device for storing and feeding of raw materials of fruit and/or vegetables for further processing of these raw materials, such that the device comprises a number of storage and feed units (40, 47/51; 55; 70) for fruit/vegetables and/or pieces of fruit/vegetables, and a bottom element (5), the storage and feed units (40, 47/51; 55; 70) are situated on a support disc (30), each of the storage and feed units (40, 47/51; 55; 70) is allocated an outlet aperture (31) in the support disc (30), and a feed disc (25) is situated below the support disc (30), wherein the feed disc (25) is arranged for rotation relative to the bottom element (5) and is provided with a feed aperture (29), that the feed disc (25) is rotatable relative to the support disc (30) making it possible for the feed aperture (29) to be brought central to any desired outlet aperture (31), with means (10, 11, 18) for conveying to a machine (JM) for further processing the fruit/vegetables and/or pieces of fruit/vegetables fed, that at least some of the storage and feed units (40; 70) comprise a cylinder (32; 71) which has in it an insert (34; 72) comprising a spiral plane (38; 76), that the insert (34; 72) comprises a further plane (39; 74) situated close to one end of the insert, and that the respective lower edges (41, 42) of the spiral plane (38; 76) and the further plane (39; 74) are situated on opposite sides of a discharge aperture (35) which is accommodated in the bottom of the cylinder (32; 71).

2. A device according to claim 1, wherein the feed disc (25) is rotated by means of an electric motor (27) and an output shaft (28) from the electric motor (27).

3. A device according to claim 2, wherein the feed disc (25) is provided with a number of bearing rollers (26) distributed along its circumference.

4. A device according to claim 3, wherein at least some of the storage and feed units (47; 51; 70) comprise a cylinder (33A; 33B; 33C) accommodating an insert which defines an at least partly conical space (45; 50; 54) which is open at both of its ends.

5. A device according to claim 2, wherein the means for conveying to a machine (JM) for further processing the fruit/vegetables and/or pieces of fruit/vegetables fed take the form of a channel (18) situated below a bottom aperture (17) of the bottom element (5), and pressure medium cylinders (10, 11) which move relative to the channel (18) the fruit/vegetables and/or pieces of fruit/vegetables fed.

6. A device according to claim 2, wherein the angle (a) formed by the respective edges (41, 42; 78, 79) of the spiral plane (38; 76) and the further plane (39; 74), which edges are situated at one end of the insert (34; 72), is obtuse.

7. A device according to claim 2, wherein at least some of the storage and feed units (47; 51; 70) comprise a cylinder (33A; 33B; 33C) accommodating an insert which defines an at least partly conical space (45; 50; 54) which is open at both of its ends.

8. A device according to claim 1, wherein the feed disc (25) is provided with a number of bearing rollers (26) distributed along its circumference.

9. A device according to claim 8, wherein the means for conveying to a machine (JM) for further processing the fruit/vegetables and/or pieces of fruit/vegetables fed take the form of a channel (18) situated below a bottom aperture (17) of the bottom element (5), and pressure medium cylinders (10, 11) which move relative to the channel (18) the fruit/vegetables and/or pieces of fruit/vegetables fed.

10. A device according to claim 8, wherein the angle (a) formed by the respective edges (41, 42; 78, 79) of the spiral plane (38; 76) and the further plane (39; 74), which edges are situated at one end of the insert (34; 72), is obtuse.

11. A device according to claim 8, wherein at least some of the storage and feed units (47; 51; 70) comprise a cylinder (33A; 33B; 33C) accommodating an insert which defines an at least partly conical space (45; 50; 54) which is open at both of its ends.

12. A device according to claim 1 wherein the means for conveying to a machine (JM) for further processing the fruit/vegetables and/or pieces of fruit/vegetables fed take the form of a channel (18) situated below a bottom aperture (17) of the bottom element (5), and pressure medium cylinders (10, 11) which move relative to the channel (18) the fruit/vegetables and/or pieces of fruit/vegetables fed.

13. A device according to claim 12, wherein a guide (22) which cooperates with an inlet aperture of a juice machine (JM) situated below the channel (18) is itself situated close to an aperture of the channel (18).

14. A device according to claim 12, wherein the angle (a) formed by the respective edges (41, 42; 78, 79) of the spiral plane (38; 76) and the further plane (39; 74), which edges are situated at one end of the insert (34; 72), is obtuse.

15. A device according to claim 12, wherein at least some of the storage and feed units (47; 51; 70) comprise a cylinder (33A; 33B; 33C) accommodating an insert which defines an at least partly conical space (45; 50; 54) which is open at both of its ends.

16. A device according to claim 1 wherein the angle ($\alpha$) formed by the respective edges (41, 42; 78, 79) of the spiral plane (38; 76) and the further plane (39; 74), which edges are situated at one end of the insert (34; 72), is obtuse.

17. A device according to claim 16, wherein at least some of the storage and feed units (47; 51; 70) comprise a cylinder (33A; 33B; 33C) accommodating an insert which defines an at least partly conical space (45; 50; 54) which is open at both of its ends.

18. A device according to claim 1 wherein at least some of the storage and feed units (47; 51; 70) comprise a cylinder (33A; 33B; 33C) accommodating an insert which defines an at least partly conical space (45; 50; 54) which is open at both of its ends.

19. A device according to claim 18, wherein the space (45) is conical all the way between the ends of the cylinder (33A).

20. A device according to claim 18, wherein the space (50; 54) comprises a cylindrical portion (52; 56).

* * * * *